United States Patent [19]
Kikinis

[11] Patent Number: 6,078,566
[45] Date of Patent: Jun. 20, 2000

[54] NOISE REDUCTION TECHNIQUES AND APPARATUS FOR ENHANCING WIRELESS DATA NETWORK TELEPHONY

[75] Inventor: Dan Kikinis, Saratoga, Calif.

[73] Assignee: Genesys Telecommunications Laboratories, Inc., San Francisco, Calif.

[21] Appl. No.: 09/069,221

[22] Filed: Apr. 28, 1998

[51] Int. Cl.[7] .............................. H04B 7/26; H04Q 7/00; G10L 3/00
[52] U.S. Cl. .......................... 370/286; 370/329; 370/338; 370/349; 455/453; 704/246; 704/251
[58] Field of Search ..................... 370/278, 280, 370/282, 286, 289, 294, 328, 329, 338, 341, 349; 375/254, 285, 296, 346; 379/406, 410, 411; 455/445, 450, 451, 452, 453, 509, 517; 704/231, 232, 233, 234, 246, 251

[56] References Cited

U.S. PATENT DOCUMENTS

| | | | |
|---|---|---|---|
| 5,299,198 | 3/1994 | Kay et al. .............................. | 370/347 |
| 5,583,965 | 12/1996 | Douma et al. .......................... | 395/2.84 |
| 5,625,877 | 4/1997 | Dunn et al. ............................. | 370/468 |
| 5,711,008 | 1/1998 | Gallant et al. .......................... | 370/328 |
| 5,909,432 | 6/1999 | Arends et al. .......................... | 370/328 |

*Primary Examiner*—Alpus H. Hsu
*Attorney, Agent, or Firm*—Donald R. Boys; Central Coast Patent Agency

[57] ABSTRACT

A system for wireless communication included an architecture of routers connected to a network and having connected transceivers for wireless transmission and reception of data, and a plurality of hand-held communicators adapted for users to communicate with the network through the routers. The system is configured for data network telephony (DNT) in the wireless portion, wherein voice data is encoded and transmitted in real time in data packets, and also provides data exchange for document-type entities. In one aspect a unique mirroring of channels from the wireless portion to a hard-wired link provides for mutual access and sharing of overall bandwidth from and to individual transceivers.

4 Claims, 5 Drawing Sheets

NOISE REDUCTION TECHNIQUES AND APPARATUS FOR ENHANCING WIRELESS DATA NETWORK TELEPHONY

FIELD OF THE INVENTION

The present invention is in the field of network communications, including Data Network Telephony (DNT), such as Internet Protocol Network Telephony (IPNT) and pertains more particularly to methods and apparatus for enhancing DNT in narrow bandwidth wireless links.

BACKGROUND OF THE INVENTION

The art of telephony communication has grown in proportion with improved telephony infrastructure, equipment, and methods of practice. Conventionally and historically telephone communication has been practiced by use of networks that provide dedicated connections and guaranteed bandwidth, such as in Publicly Switched Telephony Networks (PSTN). In such networks a call placed from a telephone connected to a local service is switched over dedicated channels to a destination, and as long as the connection is maintained, the dedicated path, having a dedicated bandwidth, is also maintained. Such networks may be termed Connection Oriented/Switched Telephony (COST) networks, and this term is used in this specification.

More recently, with the development of extensive data networks, of which the well-known Internet is a prime example, a newer type of telephony communication has been introduced. This form of telephony is termed herein Data Network Telephony (DNT), and, in the context of the Internet data network Internet Protocol Network Telephony (IPNT). Data networks typically link computers over one or more sub-nets, which may include local area networks (LAN), wide area networks (WAN) such as the Internet, company Intranets, and combinations of these and other data networks.

In DNT, such as IPNT, dedicated connections are not provided except in rare and special instances. Instead, digital audio data is prepared in standardized audio packets complete with header information and the like. The packets are prepared in near real-time and broadcast over the data network(s) connecting involved computers adapted for DNT applications. The header for each packet includes a destination for the packet.

Data Network Telephony, such as IPNT is well-known in the art, and wireless data transmission is also quite well-known in many applications. Internet service providers, for example, are recently providing high data-rate wireless Internet access by satellite systems, and, where bandwidth is not substantially restricted at the receiver's end, such systems have proven successful for WEB page delivery and the like. Such systems have not proved to be friendly for DNT applications, and there are a number of reasons, which apply to these kinds of systems and to other kinds of wireless systems of more limited bandwidth even more so.

The problems for Data Network Telephony in wireless systems are related to the real-time nature of telephony data and the typically limited bandwidth available in such systems. In relatively high-bandwidth systems having a relatively large number of users the distribution probabilities provide a situation where it is uncommon for several or many users to demand unusual bandwidth at the same time. The phenomenon is known in the art as averaging. Even with known high-use times, it can be expected that distribution will be such that bandwidth will be adequate. In most wireless systems however, bandwidth is more precious, and averaging is hence not as helpful.

A contributing problem is in the nature of real-time audio data as opposed to data transmitting stored documents and the like, which may be called data-data as opposed to voice-data. Data-data is prepared in packets for transmission from stored data of known capacity. The number of data packets needed to transmit a stored document, whether text, graphic, audio, or other, is a known quantity. Moreover, there is no fundamental loss if such data becomes delayed in transit. Once it arrives at a destination, the document may be reproduced.

Voice-data packets for real-time conversations are different. The packets for voice-data have to be prepared and transmitted in essentially real time in both directions or a meaningful conversation cannot be held. Moreover, the magnitude of packaged voice-data for a conversation will be inflated by acoustical background noise, which under some conditions can double or triple or even further multiply the amount of data having to be sent, imposing severe demand on available bandwidth.

The inventor has carefully considered the possibilities of a number of types of potential DNT applications, and has determined that it is desirable to provide DNT in wireless systems of many sorts to take advantage of some of the inherent advantages of DNT over dedicated connection-type telephony systems, and to provide DNT capability in systems that also are capable of data transfer of the data-data type described above, such as of stored digital documents and entities. A novel system in this patent application is proposed, for example, using relatively small, battery-powered, hand-held computer communicators with DNT capability to be carried by users within range of multiple Network Interface Adapters (satellite transceivers). In a preferred embodiment wireless communication is provided by RF signaling. The invention, however, is not limited to RF, and could be implemented in an Infra system or any other system providing wireless communication.

In such a system the Network Interface Adapters may be coupled, for example, to a Local Area Network. Such a system would be quite useful on a company premises for workers to keep in touch, hold phone conversations, share documents locally (Campus Intranet ), and communicate with the Internet and other connected computers as well (Inter Campus Intranets or Extranets). Many variations of such systems are possible, but present technology does not render such systems really practical. Methods and apparatus according to various embodiments and aspects of the present invention, taught in enabling detail below, provide substantial improvements rendering such voice/data systems on narrow bandwidth links quite feasible and useful.

SUMMARY OF THE INVENTION

In a preferred embodiment of the invention a data network telephony (DNT) system is provided, comprising a base station connected to a DNT-capable data network and to a wireless transceiver and adapted to operate the transceiver by a two-way, narrow-band, multiple-channel, real-time duplex radio protocol; and a plurality of portable computer-enhanced communicator units, including microphone and speaker apparatus, each adapted to communicate with the base station by the two-way real-time radio protocol and to process DNT calls. The base station is further adapted to process DNT calls on the DNT-capable data network and to broadcast and receive the DNT calls to and from the plurality of communicator units via the transceiver as DNT data packets. In one embodiment DNT-capable data network is a local area network (LAN).

In preferred embodiments one or more of the communicator units is equipped with Digital Signal Processors (DSPs) adapted for recognizing human speech, and audio data for DNT calls is processed by the DSPs, allowing substantially only human speech to be prepared as DNT packets for transmission.

In another aspect, related to noise reduction one or more of the communicator units is equipped with noise cancellation microphone and speaker apparatus adapted for creating a noise reduction zone in the region of a principle speech input microphone. A method is provided for a system providing wireless communication between a portable communication unit and a base station over a dedicated channel, wherein the portable device is adapted for Data Network Telephony, a method for minimizing data traffic in the channel, comprising steps of (a) accepting speech at a microphone at the portable communication unit; (b) processing the speech by a digital signal processing (DSP) system adapted to distinguish between human speech and background noise; and (c) preparing and transmitting data packets from substantially only the human speech. In this method in some embodiments the DSP function is provided by a specific chip or chip set coupled to an internal bus of the portable device. In others the DSP function is provided by a CPU of the portable communication unit.

In yet another aspect of the invention, in a wireless communication system having a base station connected by a hard-wired link to a transmitter/receiver (transceiver), wherein a gross wireless bandwidth is allocated by channels for individual users, a method is provided for ensuring sharing of the bandwidth among the users, comprising steps of (a) mirroring the channel assignments for wireless communication to the users in the hard-wired link, creating thereby virtual channels in the hard-wired link; and (b) transmitting data meant for a specific channel to the transceiver for wireless transmission according to the virtual channels imposed on the hard-wired link.

The unique nature of the wireless communication of the present invention provides the advantages of real-time data-network packet telephony in a very narrow-band system, extending the technology of such telephony into the realm of hand-held, portable communicators.

BRIEF DESCRIPTION OF THE DRAWING FIGURES

DESCRIPTION OF THE PREFERRED EMBODIMENTS

Figure 1:
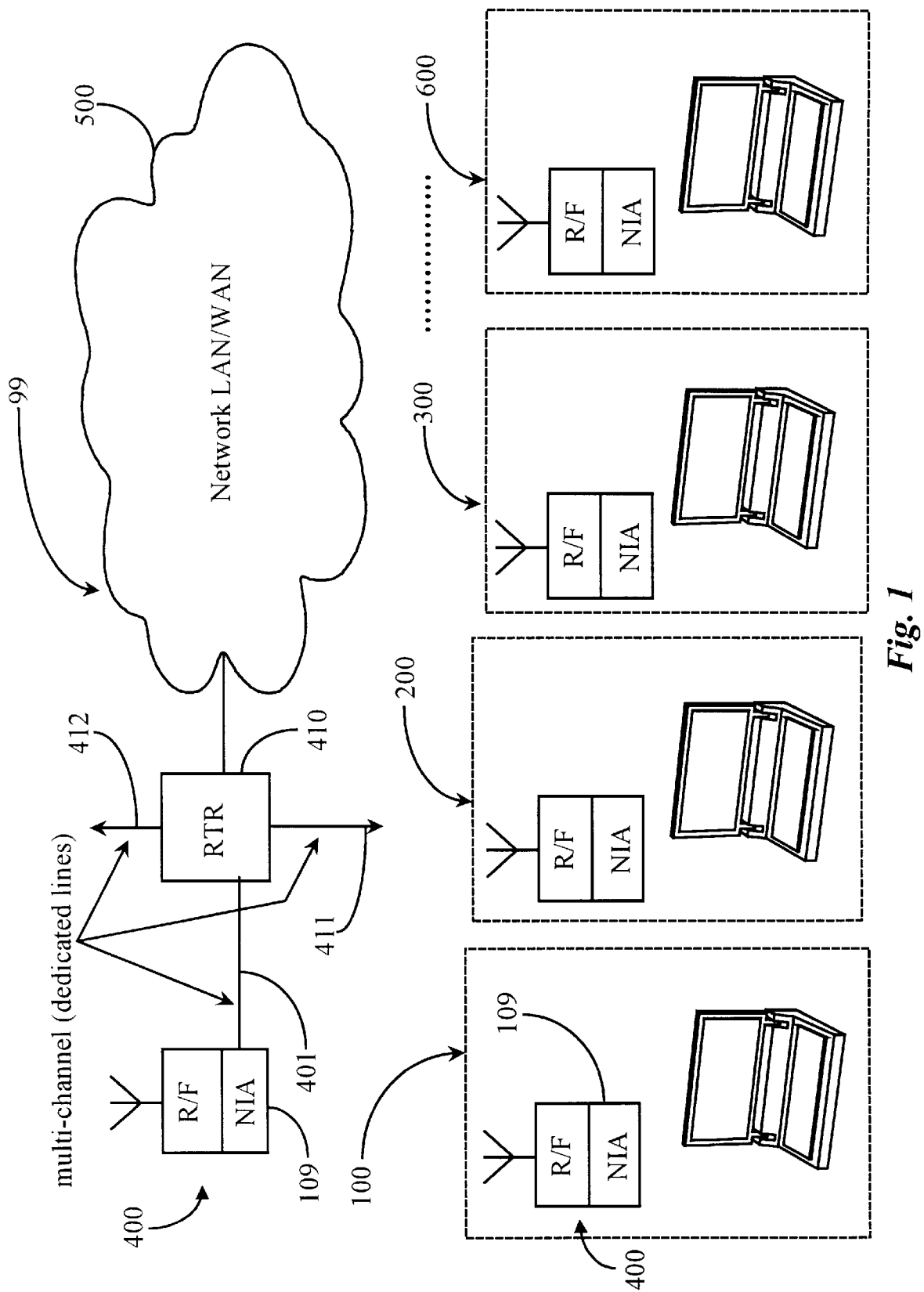
FIG. 1 is an architectural overview of a wireless DNT system according to an embodiment of the present invention.

FIG. 1 is an architectural overview of a wireless DNT voice-data system 99 according to one embodiment of the present invention. Wireless voice/data system 99 comprises a plurality of receiving/sending hand-held units 100–600 that may be carried and used by individuals mobile throughout a local area such as a corporate campus having several buildings, and so on. System 99 in various embodiments is a radio-frequency (RF) based communication system, and may be a time-division-duplex multiple access (TDMA) system, a code-division multiple access (CDMA) system, or any other type two-way wireless protocol system, all of which are well-known in the art or may be invented in the future, but that are essentially wireless systems.

In other embodiments, voice/data system 99 may operate via infrared or other known or future form of wireless communication. Radio frequency systems are used in this embodiment for illustration because of their flexibility and abundance in the art. In some situations a combination of wireless technology may be used such as RF in combination with infrared capability with the infrared capability attributed to peripheral devices that may be used with a system.

Each hand-held unit 100–600 (there may be more or fewer) is of the form of a portable computer and communication device such as a palm-top computer. Such devices are known in the art and may be suitable for practice of the present invention with addition of certain elements which will be clear from following descriptions. Each receiving/sending unit communicates via RF, as previously described, and has an RF interface module such as interface module 109 that is capable of receiving and sending radio signals and has a network interface capability.

Each unit 100–600 has appropriate computer functionality attributed to palm-top and other portable style computers, and is powered, in most embodiments, via rechargeable battery. In some embodiments where portability is not an issue, they may be powered electrically via wall socket adapters as well, with recharge capability for battery packs. However, in a preferred embodiment unit 100 is portable. It will be apparent to the skilled artisan that many more units as allowed by available bandwidth may be used within a voice/data system 99.

Each unit 100–600 is capable of communicating in RF mode with a satellite transceiver 400 that may be located in a convenient proximity (communication range) to the sum of portable units within a sub-net of system 99. Satellite transceiver 400 is dedicated to broadcasting and receiving data in RF mode to and from each unit such as unit 100–600 and has appropriate interface capability for computer communication as well as radio frequency sending and receiving capability. Satellite transceiver 400 is linked via dedicated digital connection 401 to a router 410 in the embodiment shown. This link may be any one of many sorts, such as serial pair, optical link, and so on.

Router 410 is, more specifically, a digital routing node, adapted for routing data packets as in a digital network like the Internet. However, in some specialized embodiments wherein calls are received from a telephone network such as the Public Switch Telephone Network (PSTN) as well as from a digital network, a router encompassing both types of telephony capabilities may be used. A router with dual capability (i.e. routing both PSTN calls that are converted to DNT calls and originally sourced DNT calls) is known to the inventor.

Router 410 is linked via digital network connection to a network 500. Network 500 may be of the form of a local area network (LAN), a wide area network (WAN), the Internet, an Intranet, or another type of public or private digital network known in the art. Router 410 may be further linked as illustrated via dedicated connections 411, and 412 to other routers or transceivers (not shown) as would be the case with a multi-distributed system wherein voice/data systems such as system 99 are duplicated and distributed over a larger geographical area (i.e. a campus) and linked to a network such as network 500. Dedicated connections 411 and 412 are identical in scope to connection 401 as previously described.

In an exemplary system according to the invention, each transceiver, such as transceiver 400, communicates with users over 16 dedicated narrow-bandwidth channels. There may be, in some instances, more than 16 units 100–600 in a transceiver area and assigned to users and a transceiver channel. In some cases, a channel may be shared by two or more infrequent users while a frequent user may have a dedicated channel. In embodiments of system 99 having multiple transceivers, users with communication devices roam from system to system as will be described further below.

According to a preferred embodiment of the present invention, DNT such as IPNT may be practiced by a user operating a portable communication device such as unit 100 while connected in wireless mode to a voice/data system such as system 99, enabling the user to actively send and receive real-time data associated with DNT as well as to perform other data tasks such as file downloading, uploading and the like without losing the quality of the real-time DNT communication. Such a user may also roam away from and out of range of system 99, in a multi-distributed embodiment, wherein any real-time data that was sent but not received by the user as he or she moves between transceiver regions is immediately rerouted as the user is associated with a new satellite transceiver. This feature allows a user to be completely mobile during real-time data transfer.

As previously described with reference to the background section, DNT is not currently practical when practiced on networks having narrow dedicated bandwidth such as TDMA or CDMA systems as compared to high bandwidth systems (i.e. satellite wireless and connection-oriented systems) wherein sufficient bandwidth for DNT and other data transfer can be assured by packet averaging techniques and so on. Therefore, it is an object of the invention to provide method and apparatus for enabling successful and economical practice of DNT including IPNT over wireless networks of the prevalently existing narrow-bandwidth type described above. Such method and apparatus of the present invention is detailed in various embodiments below.

Figure 2:
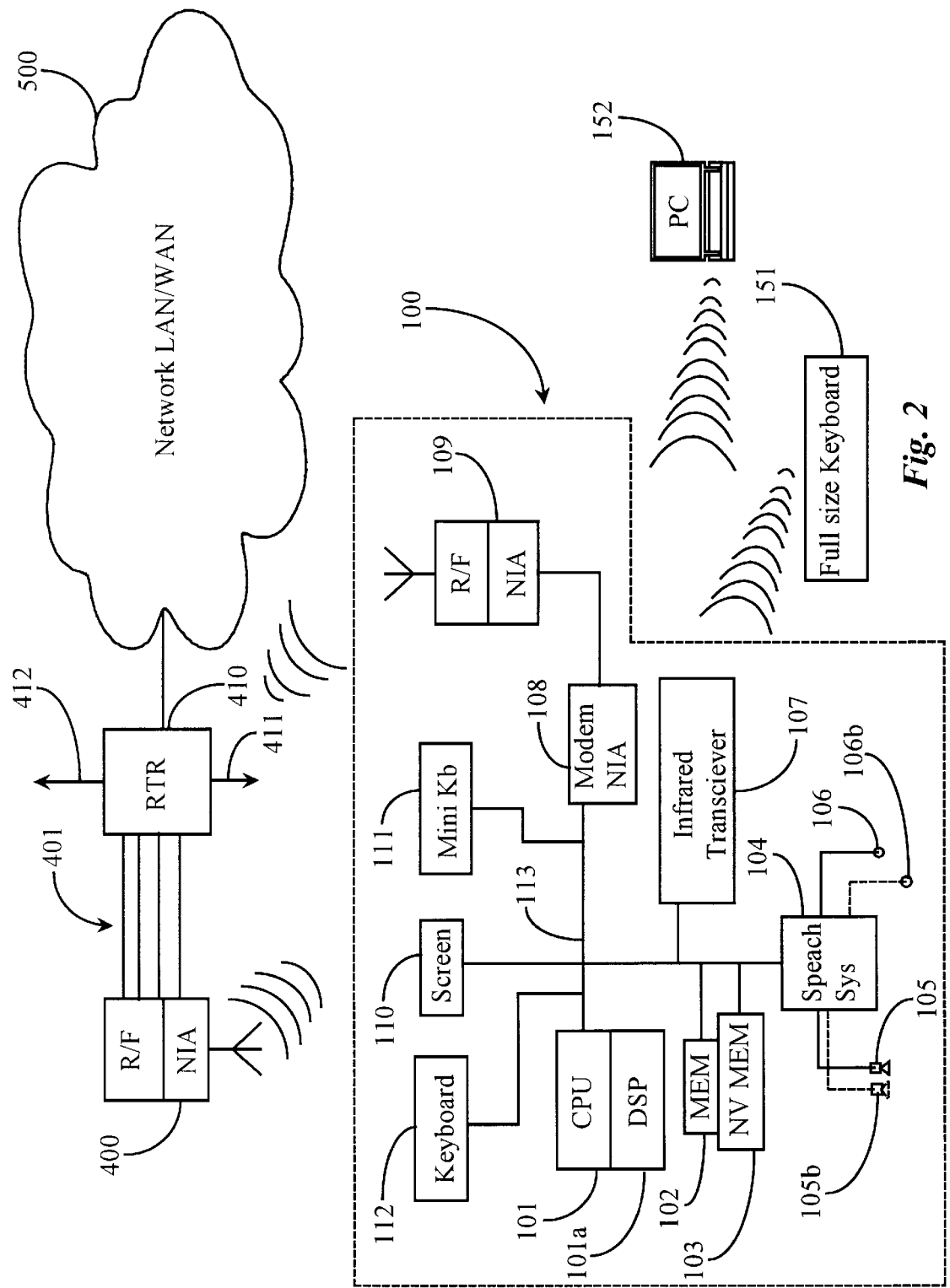
FIG. 2 is a system diagram of the components and connectivity of components within a hand-held DNT device and associated network elements according to an embodiment of the present invention.

FIG. 2 is a system diagram of the components and connectivity of components within voice/data unit 100 of FIG. 1, and associated network elements external to unit 100 according to an embodiment of the present invention. Voice/data hand-held unit 100 is shown in FIG. 2 as a block diagram to reveal various components and features, some of which are enabling to unique features of the present invention, and some of which are standard features available in current art and generic to such devices.

Unit 100 has a central processing unit (CPU) 101 in this embodiment including a digital signal processor (DSP) 101*a*. In some embodiments, DSP 101*a* may be separate from CPU 101, such as a separate chip communicating on bus 113. DSP 101 a is adapted for voice recognition and may discern human voice from background noise. DSP functionality as provided in this embodiment is unique and is described in further detail below.

Because unit 100 is a portable computer as well as a DNT communication device, suitable memory for storing programs and data is provided as memory (MEM) 102 and non-volatile memory (NV MEM) 103.

A speech system 104 contains the necessary components for enabling DNT and IPNT telephony communication, and for doing necessary A/D and D/A conversion between digital voice-data and analog voice signals from a microphone (mic) or to operate a speaker. In this embodiment, a microphone 106 and a speaker 105 are provided for audible send and receive function. In some cases an additional noise cancellation microphone 106*b* and a noise cancellation speaker 105*b* are included for the purpose of minimizing background noise. More detail regarding this unique noise elimination technique as applied to an embodiment of the present invention is provided below.

An infrared tranceiver 107 is provided for the purpose of interfacing with peripherals that communicate via infrared signal. Infrared transeceiver 107 accepts input from such peripherals and converts the data to digital form for bus 113. Of course any other type of wired (such as USB) or wireless desktop network could be employed, including but not limited to induction, RF and so forth. Data-data, as referenced in the background section, such as file documents and the like, may be converted to infrared data and stored, executed, or printed on infrared-capable peripherals that may be used with system 99.

A standard keyboard 112 and screen 110 are provided to unit 100 as with most portable computers. The screen may be any of a broad variety of such devices as known in the art. The keyboard may be a QWERTY keyboard or another sort. A mini-keyboard 111 may also adapt to unit 100 in some embodiments instead of keyboard 112 for the purpose of input for operation of unit 100, for example mimicking a simple telephone interface. Similarly, peripheral devices such as a full size keyboard 151 a PC 152 may communicate with unit 100 via infrared or other wired or wireless link as previously described. RF interface 109 provides digital wireless interface with transceiver 400.

It will be apparent to one with skill in the art that there may be generic or new features inherent or known to the inventor to a palm-top or lap-top computer that are not described in detail in this embodiment. The inventor intends only to detail those aspects incorporated into unit 100 that are relevant to operation of the present invention. Commonly found components such as screen 110 and keyboard 112 will not be described with great detail because to do so may obscure the innovative aspects of the present invention. More detail regarding the innovative aspects according to embodiments of the present invention are provided below.

Improved Noise Reduction for DNT Application

In embodiments of the invention each satellite transceiver 400 in the system of FIG. 2 (there may be additional such tranceivers connected to router 410, or to equivalent routers) typically broadcasts on a fixed number of channels within an assigned frequency range over an area surrounding the transceiver. Typically, each hand-held unit tunes to a particular channel, which may be negotiated with router 410 or other intelligence in the system. As a result there are typically a relatively small number of users in such a system in the range of one satellite, and each user is dealing with router 410 through transceiver 400 over a very "thin pipe". By thin pipe in this specification is meant a connection to a user via a channel with very limited bandwidth.

It appears to the present inventor that a major concern when practicing DNT over such a narrow-band thin pipe is noise reduction capability. As previously described in the background section, background noise severely limits the bandwidth available, because as packets are prepared in substantially real time, packets must be prepared for background noise, even during long pauses in conversation. Bandwidth may therefore be wasted that could profitably be used for other purposes, such as exchange of data-data or, depending on the wireless network, for sharing with other users. The inventor proposes two approaches which may be used separately or may be combined to considerably reduce the waste of bandwidth by background noise for DNT over a narrow-band pipe.

The first implementation involves the use of DSP (see DSP 101a of FIG. 2) technology with speech recognition capability, and is described and illustrated below.

Figure 3:
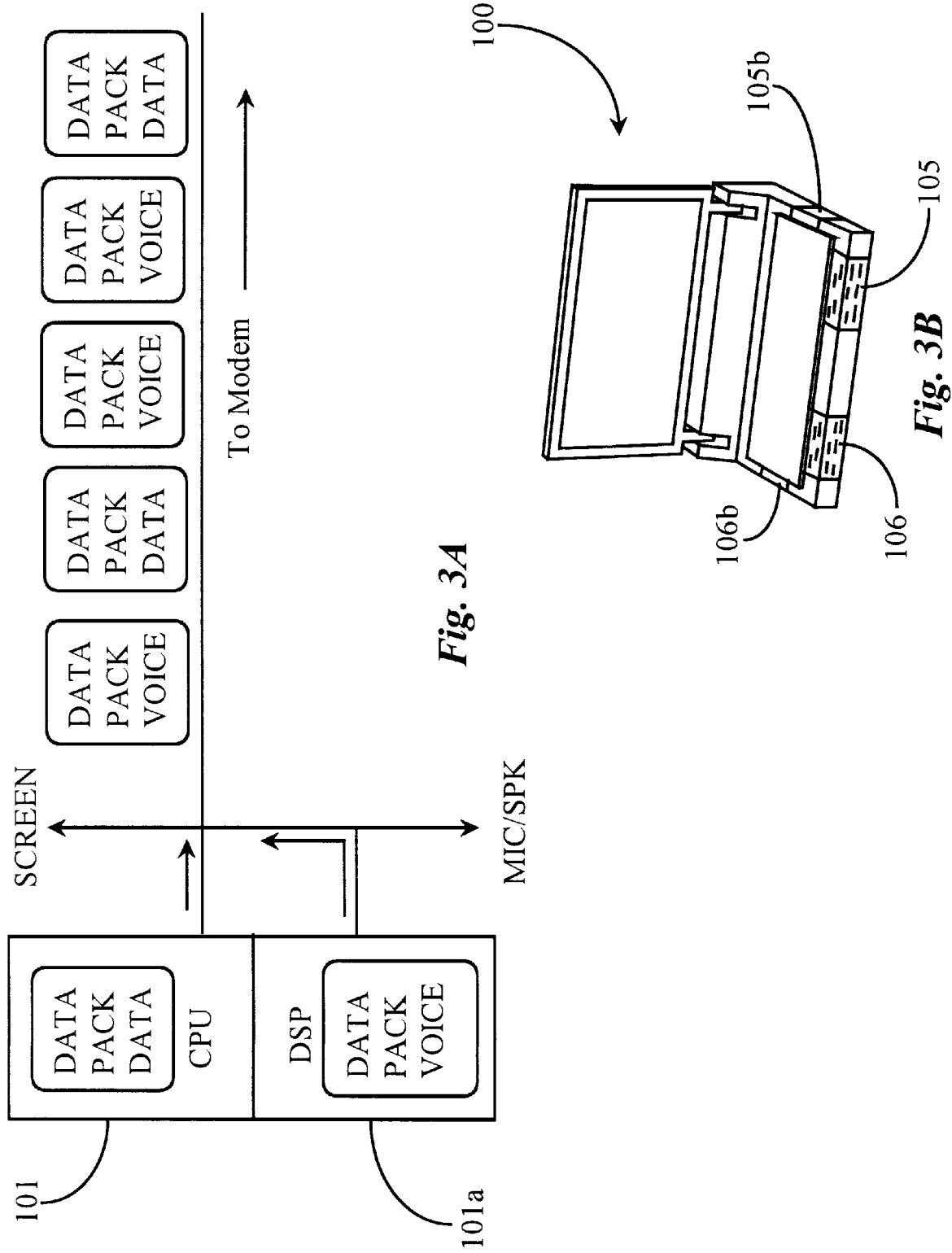
FIG. 3A is a block diagram illustrating DSP function according to an embodiment of the present invention.
FIG. 3B is a perspective view of unit 100 of FIG. 1 showing speaker and microphone placement.

FIG. 3A is a block diagram illustrating DSP function according to an embodiment of the present invention wherein only voice data packets and real data packets are sent during a transaction with a calling or called party.

DSP technology, while known in the art and applicable to many different types of products, is an innovative approach as it is applied to an embodiment of the present invention. The inventor knows of no current narrow-band wireless application wherein DSP with speech recognition is used for the purpose of managing bandwidth whereby only necessary data packets for voice-data are created during a real time transaction such as a DNT voice call. Data-data associated with file transfers and the like are created normally and sent along with voice data. In some instances, CPUs can be used to perform DSP tasks, and hence no extra physical implementation of the DSP has to exist. Also, some newer DSP design lend themselves to handle general purpose CPU/MPU functions, and hence can handle all aspects by themselves.

Referring now to FIG. 3A, as a user speaks into a microphone during a call. DSP 101a with speech recognition capability monitors input, sorts out speech from non-speech, and creates data packets for voice only and will not create packets during pauses when the user is not speaking. In this way, bandwidth is made available for other functions because data packets containing background noise and the like are never created. Data-data packets containing non-voice data such as file-transfer data and the like are created in normal fashion and sent along with DNT packets if the user is, of course, transferring a file and talking on the unit at the same time. This technique in this embodiment assumes that there is sufficient bandwidth for muti-task functions while actively engaged in a DNT call.

The speech recognition function of the DSP chip may be programmed or trained to recognize different languages and so on. Also long sighs and other verbal non-descriptors may be ignored during the monitoring and DNT packet generating process.

In another embodiment of the present invention, a DSP chip with speech recognition capability is also provided in routers such as router 410. By using digital to analog conversion modules known in the art, incoming DNT packets, before encountering may be monitored by a similar DSP at router 410 and non-speech packets in a received DNT data stream can be eliminated, effectively making more efficient use of the narrow bandwidth of each channel to a user. DSP apparatus and techniques as described can effectively minimize bandwidth demmand for DNT in narrow wireless channels in either or both directions.

FIG. 3B is a perspective view of unit 100 of FIG. 1 showing noise-cancellation speaker and microphone incorporation. While DSP with speech recognition capability is effective in reducing unwanted background noise, it may not be 100 percent effective, therefore another noise reduction technique is used wherein possibly a second microphone 106b and possibly one more speaker 105b are provided and strategically located on unit 100 for the purpose of canceling background noise that may be present at the users location. Depending on the implementation and the physical design of the device, additional MIC/SPKR may or may not be needed. If a system such as system 99 of FIG. 1 is implemented in an industrial setting, for example, background noise may be particularly significant. Speaker 105 and microphone 106 are used for normal speech and audio function during a DNT call or may be used in combination for noise cancellation.

It will be apparent to one with skill in the art that there may be more than one noise-cancellation speaker 105b as well as more than one noise-cancellation microphone 106b in unit 100 without departing from the spirit and scope of the present invention. The number and location of such devices will depend in part on intended application. For example, in a quiet environment, they may not be needed at all, whereas, in a noisy environment maximum capability may be desired. In general, the noise cancellation system works by intercepting background noise by the auxiliary mic (106b), then playing background noise back through one or more noise cancellation speakers placed to cancel backgound noise in a region at the principle mic 106. Such noise cancellation is known in the art for such as traffic noise and the like, but application and implementation to background noise reduction enhancing DNT over narrow wireless links is surely unique and not obvious.

It will be apparent to one with skill in the art that cancellation speakers and microphones may be held separate from unit 100 without departing from the spirit and scope of the present invention. One example of this would be utilization of a noise cancellation head-set.

Pipe-Mirroring in a Narrow Band Wireless Multi-Access System

Attention is directed to FIG. 2, to hard wired link 401 between intelligent router 410 and transceiver 400. Router 410 is adapted to route data packets for both voice-data in DNT and data-data for such as file transfers to users in an area covered by transceiver 400. Typically each user is assigned a channel within the breadth of the tranceiver. Therefore voice-data and data-data for each user occupies just that channel in the wireless link between transceiver 400 and each user's hand-held unit. The hardwired link 401 is, however, preferably a single line, and carries all of the combined data for all the users in the area of transceiver 400. This arrangement, however, can be troublesome, as router 410 sees only the combined bandwidth of all the channels. Therefore, in the event one or more of the users elects to download a large amount of data, router 410 would typically command the entire bandwidth of hardwired link 401 to transfer the data to transceiver 400, and any or all DNT communications may be interrupted. In a preferred embodiment of the present invention, then, router 410 treats hardwired link 401 as though it were a link of the bandwidth of the wireless channel for each user, dividing the hardwired link into a number of parallel pipes equal to the number of wireless channels used. Data management between real time voice-data and data-data is therefore maintained for the system between the router and the users, and DNT may be effectively maintained for the individual users.

QoS Functionality on Ultra-thin Pipes

In a preferred embodiment of the present invention, in order to insure that DNT data is prioritized when sending a combination of DNT data and application data via the narrow-band wireless channel for each client, a basic but innovative Quality of Service (QoS) scheme is implemented on the client side.

Traditional bi-directional QoS application schemes such as resource reservation protocol (RSVP) and similar schemes are known by those skilled in the art to be only used in high bandwidth applications where there are many users sharing available bandwidth. It is also well known that QoS assurance on both ends of a pipe has to be negotiated along the way from node to node. Also, QoS implementation across multiple networks is difficult. Some standardization is required so that all network points understand and support the language protocol of the scheme being used.

Figure 4:
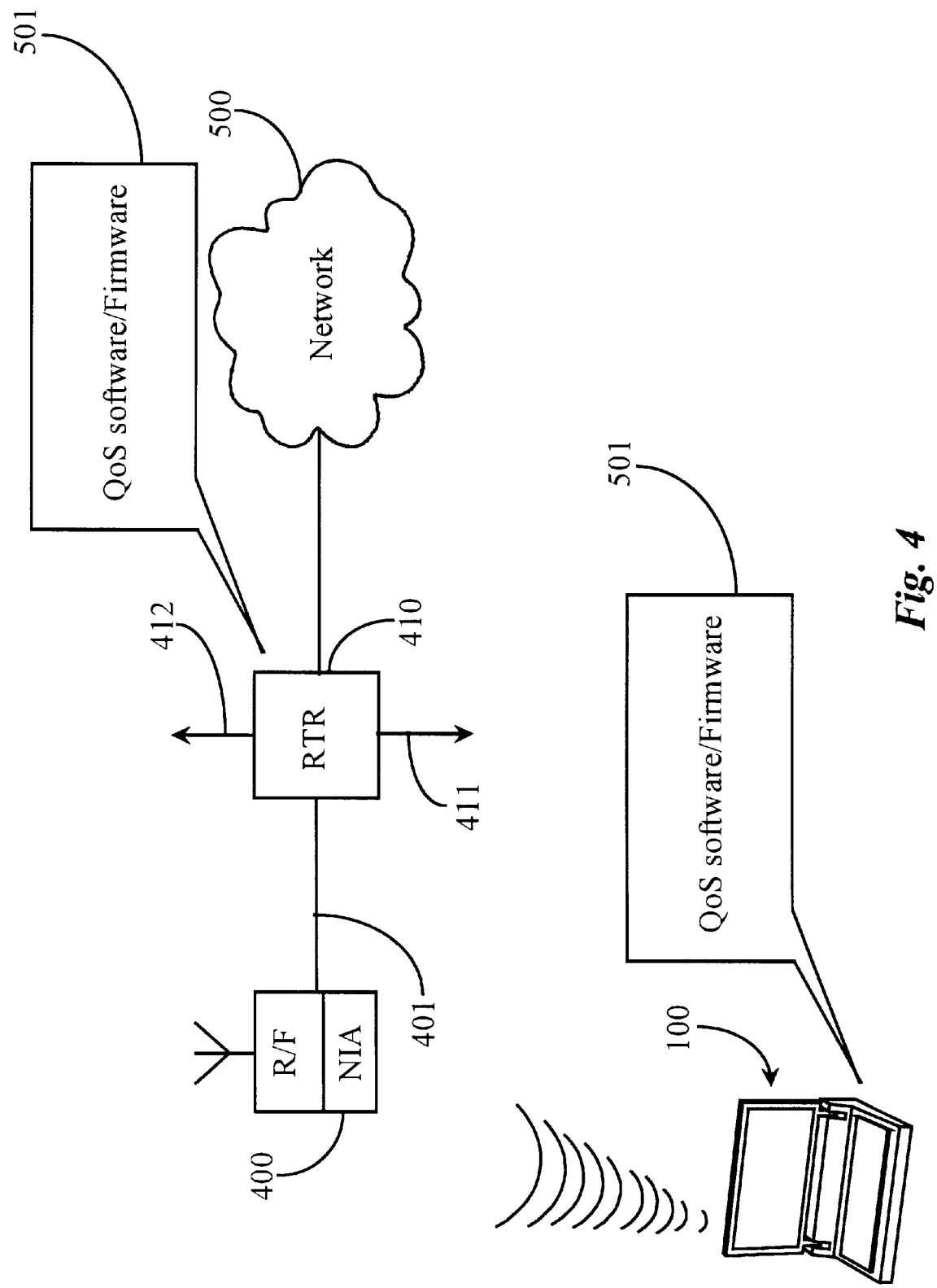
FIG. 4 is a conceptual diagram illustrating QoS components and negotiation according to an embodiment of the present invention.

FIG. 4 is a conceptual diagram illustrating QoS management according to an embodiment of the present invention.

It is the intention of the inventor to provide a new, one-sided QoS implementation from the clients side to the other end of the pipe, namely router 410. This is accomplished in embodiments of the invention either with firmware that is embedded in NV MEM 103, or via a software application 501 installed in system memory available in unit 100. In this embodiment, an instance of application 501 also resides in router 410. The application provides a fixed algorithm that always prioritizes DNT data both in unit 100 and in router 410. In this way, DNT data, as real time data is always assured sufficient bandwidth. If another data type such as data from file transfer is initiated while simultaneously engaging in a DNT call, all such packets are held until there is a pause in the speech wherein no DNT data is being transferred. The transferring of files initiated by unit 100 takes place only during data gaps in the prioritized DNT communication. This is a one directional feature that only effects the communication link between unit 100 and router 410, and the instances of application 501 at each end operate independently of the other. In other embodiments the unique unidirectional QoS routine may be used only at one end of the pipe or the other, either in router 410 or in the user's hand-held unit.

Dynamic Address Translation

In yet another embodiment of the present invention, a method is provided whereby a user may roam away from and out of range of a transceiver such as transceiver 400, and be smoothly and efficiently logged onto another transceiver in system 99.

Figure 5:
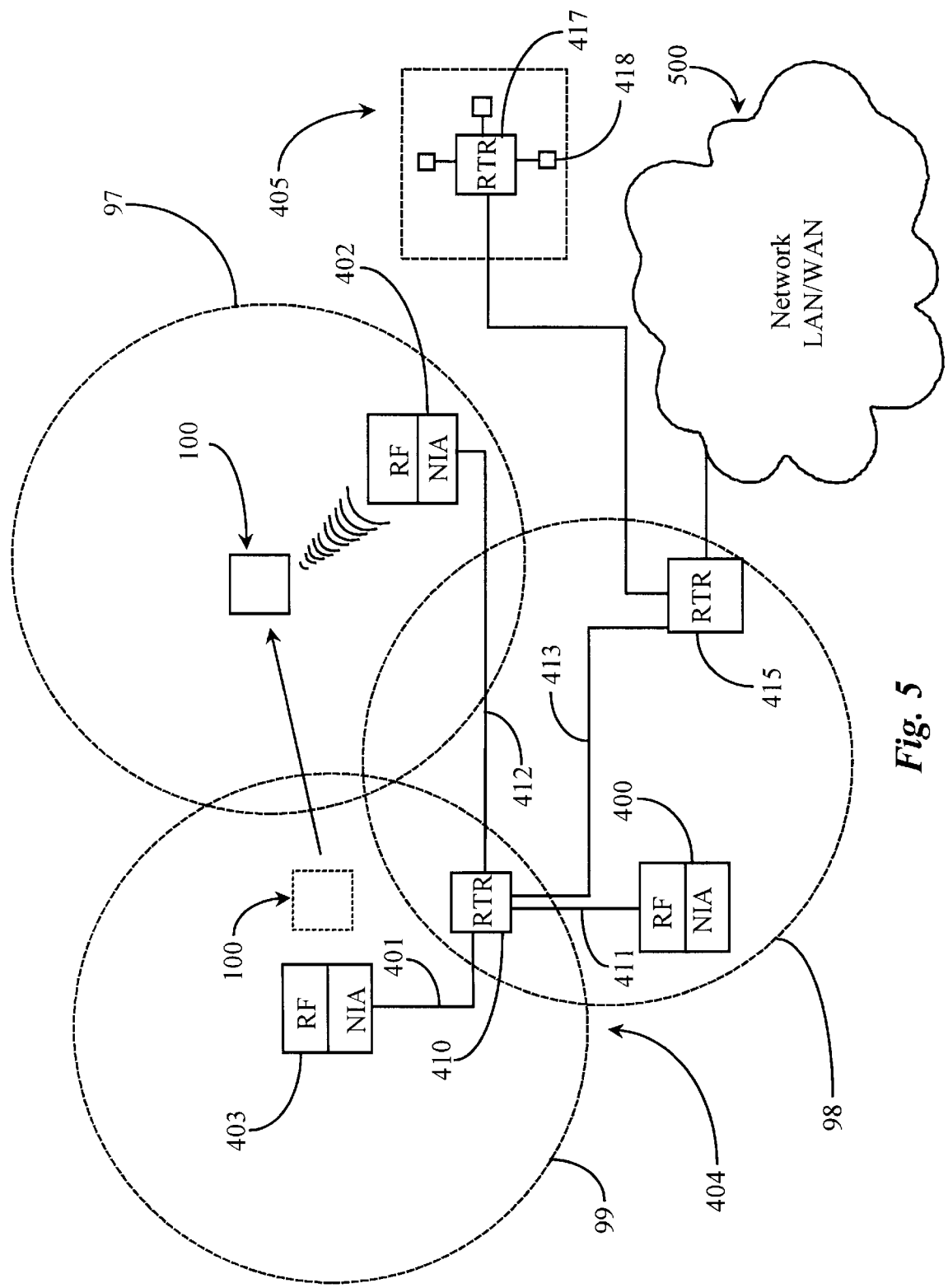
FIG. 5 is a block diagram illustrating dynamic address translation according to an embodiment of the present invention.

FIG. 5 is a block diagram illustrating dynamic address translation according to an embodiment of the present invention. Three transceiver regions 97, 98 and 99 are shown provided by separate transceivers spaced apart from each other but with overlapping areas, as is known in the art for such wireless systems; as is done in cell-phone systems, for example. Together, regions 97, 98, and 99 define a sub-net 404. Sub-net 404 is, in this case, serviced by a single router 410. Such a case may represent, for example, a technical campus. Each unit 100 is capable of operating on one or another of defined channels in each of regions 97–99, and RF tuning in the hand-held units is a matter of apparatus and procedures that are all well-known in the art.

Router 410 in this embodiment is a lower-level router in a multilevel routing system connected to a higher-level router 415 via link 413. In this embodiment router 415 is a Master router for the wireless system, and is linked to Net 500. Master router 415 may be linked as well to other lower-level routers such as router 417 in another subnet 405 equivalent to subnet 404, which in turn controls three transceivers, such as transceiver 418.

It will be apparent to the skilled artisan that there is a broad variety of architectures that might be implemented comprising routers in hierarchical levels, interconnection among routers, and connection of routers to transceivers to accomplish coverage of an area for such a wireless communication system. The architecture illustrated here is one of many possibilities, and is used for exemplary purposes to illustrate improved tracking of users across subnets in an embodiment of the present invention.

Generally speaking, when incoming DNT calls arrive at master router 415, they are routed appropriately based on routing tables in the several routers. In the overall system, each user may have a home location served by a particular transceiver connected to a particular router. A particular user may, for example, typically be found in region 99 served by transceiver 403 connected to router 410. This user will then be listed on the routing table of router 410 and the table of Master router 415. If a call comes in to Master router 415 for this particular user, the call will be quickly routed to the proper end router and transceiver by virtue of the routing list entries. Each satellite transceiver such as transceiver 403 has a fixed number of channels, and a channel is assigned to each user.

The purpose of a distributed system of the sort illustrated in embodiments of the present invention, is to provide communication for all users regardless of the particular region (transceiver), and to allow users to move from region to region while maintaining communication.

As an example, the user of unit 100, shown in FIG. 5 as resident in region 99, has decided to roam to region 97 covered by transceiver 402. In the system of various embodiments, location negotiation is periodically executed by each unit in operation with the nearest transceiver. As long as a user does not move from one region to another, the routing tables do not change. As the user of unit 100 enters region 97, negotiation communication will occur with both transceivers 403 and 402. At some point the system will determine that the user is to be handed off to transceiver 402, at which time the routing tables are updated, deleting the particular user from transceiver 403 and assigning the user to transceiver 402.

Each hand-held unit tunes to the system-assigned channel, and unit 100 will initially negotiate with router 410 through transceiver 402 on the same channel that was assigned to the unit in region 99 served through transceiver 403. There may, however, be one or more users in region 97 assigned to the same channel, and once the routing tables are updated, the channel assignment may change in the newly-entered region. Each transceiver, for example may have more channel capability than users expected at any one time to be in that region, and therefore may have unused channels at any point in time that may be assignable to users newly entering the particular region.

In this example, router 410 services both regions 99 and 97 through transceivers 403 and 402 respectively, making this a relatively simple example of ripple. However, if the user of unit 100 were to roam to subnet 405, where the transceivers are controlled by router 417, then unit 100 would ping that new router through the closest satellite transceiver, and negotiate entry into the new subnet. In this case the user would be moved from the routing table in router 410 to the routing table in router 417, rather than just updating the routing table in router 410 to a new transceiver and region.

In the process of rippling, users throughout the overall area covered by a wireless system are tracked, and their location relative to the network of transceivers is noted. Routing lists at each router are updated as users move from region to region in the manner described above, wherein the minimum change is made with minimum impact on the stored and updated data for the system.

When a user moves from region to region as has been described, and routing lists are updated, there will be instances wherein a user is receiving real-time data packets for DNT as the user's location is updated. At the time that the user is relisted in a new region, there may well be data packets delivered to the router where the user was previously listed. In this instance real-time data packets, or for that matter any data packets, that are left behind in this manner, are retrieved and forwarded immediately to the router serving the region to which the user has been moved, so there is no apparent loss in the data stream for the roaming user.

It will be apparent to the skilled artisan that there may be a varying number of routers such as router 410 assigned a varying number of satellite transceivers without departing from the spirit and scope of the present invention. There may also be, in more sophisticated systems, several hierarchical levels of routers. There are many possibilities for system architecture.

Personal Router in Client

In yet another embodiment of the present invention, a software application known to the inventor as a personal router application is employed for flexibility in routing. Complete and enabling detail for such a personal router system is taught in patent application 08/869,815, assigned to the assignee of the present patent application, and the prior application is incorporated herein in its entirety by reference.

In the personal router system a user, through an executable application at the hand-held unit, may, among other capabilities, program alternative actions for incoming calls. For example, a user may need to leave an area, and a co-worker is selected to cover the first user's responsibilities. In this case, the first user can program through the handheld unit and the personal router application, for incoming calls to the first user to be re-routed to the alternate. A broad range of other alternatives is available, including automatic answering with pre-recorded messages, call-holding, and many others. In a preferred embodiment a user interface is provided wherein incoming calls are represented by icons on the user's screen, which the user may select to manipulate calls.

In one embodiment the bulk of the personal router application is resident at the system routers, and each user has an interface whereby he/she may access the application on the system router in a client-server fashion, and edit routing rules on the router to effect the manner in which incoming calls for the user are handled. The rules that may be invoked in this manner are limited only by system capabilities and the user's needs.

The personal router application provides maximum flexibility to the user without requiring additional equipment. A user need not be resident in any one voice/data system in order to apply his personal routing rules. By having an instance of the router application at each of the routers in the network, a user may roam without losing access to personal routing capability. By utilizing a hierarchy of routers, personal routing capability may be scaled up to cover a large geographical area such as routing calls to other sub-nets and so on.

It will be apparent to one with skill in the art that the personal routing application may be used in conjunction with other routing applications that may be implemented separately from individual units without departing from the spirit and scope of the present invention. For example, as a DNT telephony application, routing software may be stored at a machine dedicated to interfacing with routers so that more complicated routing rules may be observed.

Practicing DNT Wireless Telephony on a CSMA/CD type Network

All of the embodiments of the present invention as previously taught herein are applicable to assigned the typical bandwidth types of wireless networks such as TDMA and CDMA networks. However, successful practice of the present invention in various embodiments can be further enhanced by implementing a wireless protocol between transceivers and users based on the characteristics of carrier-sensed multiple-access networks including collision detection (CSMA/CD). This type of network is most often employed as a hard-wired or wireless LAN architecture such as Ethernet.

In CSMA/CD all data is transmitted over a shared channel and each registered device that attempts to transmit data on the network must first listen to see if the network is free carrier sense). Each device has a preset priority to use the available bandwidth over the network (multiple access). If two devices attempt to transmit at the same time, a collision occurs which is detected by all devices on the network (collision detection). Each device typically plans it's second-attempt transmission at a random amount of time after a collision is detected. As all of this takes place in a matter of micro-seconds, CSMA/CD provides a means of efficiently utilizing available bandwidth in a wireless shared system.

Bandwidth-on-demand means that no device transmits during the transmission of another device on the network. Instead of individual channels of dedicated bandwidth being assigned to each unit, all incoming DNT communications are broadcast over the network wherein each unit picks up it's own coded information via addressing within the packet frame.

CSMA/CD in wireless mode operates virtually the same as in hardwired mode except that the network architecture with respect to linked devices would be closer than would be the case with a wired network. The inventor knows of no wireless CSMA/CD network that currently practices DNT. For purposes of the present invention the wireless CSMA/CD implementation could use existing wireless LAN technology with the replacement of Network Interface Adaptor (NIA) adapters such as module 109 of FIG. 1 with existing Is LAN type network adapters.

It will be apparent to one with skill in the art that the methods and apparatus of the present invention as taught by the various presented embodiments allows DNT including IPNT to be practiced efficiently and economically on a wireless narrow-band network having dedicated channels as well as a wireless network having a shared channel with carrier sense capability and collision detection capability without departing from the spirit and scope of the present invention. For example, the methods and apparatus of the present may be implemented in various networks such as TDMA, CDMA, Global System Mobile (GSM), and other similar networks as well as CSMA/CD type networks.

It will also be apparent to one with skill in the art that such a wireless network enhanced by methods and apparatus of the present invention may comprise a plurality of voice/data systems belonging to one of a plurality of sub-nets each controlled by a router with each router linked to a LAN, a WAN, including but not limited to, the Internet. There are many other architectural possibilities with regards to building such networks. The spirit and scope of the present invention is limited only by the claims that follow.

What is claimed is:

1. A data network telephony (DNT) system, comprising:
   a base station connected to a DNT-capable data network and to a wireless transceiver and operating the transceiver by a two-way, narrow-band, real-time duplex radio protocol;

a plurality of portable computer-enhanced communicator units, including microphone and speaker apparatus, each adapted to communicate with the base station by the two-way real-time radio protocol and to process DNT calls; and at least one Digital Signal Processor (DSP) for recognizing human speech in each of the communicator units;

wherein the base station processes DNT calls on the DNT-capable data network and broadcasts and receives the DNT calls to and from the plurality of communicator units via the transceiver as DNT data packets, and wherein the communicator units create data packets for transmission only in response to the DSP recognizing human speech.

2. The DNT system of claim 1 wherein the DNT-capable data network is a local area network (LAN).

3. The telephony system of claim 1 wherein the voice recognition function of the DSP's may be programmed or trained to recognize different languages.

4. The telephony system of claim 1 wherein during the monitoring of voice inputs, other verbal non-descriptive speech may be ignored as non-speech.

* * * * *